United States Patent
Roshtkhari Javan et al.

(10) Patent No.: US 10,430,953 B2
(45) Date of Patent: Oct. 1, 2019

(54) SYSTEMS AND METHODS FOR OBJECT TRACKING AND LOCALIZATION IN VIDEOS WITH ADAPTIVE IMAGE REPRESENTATION

(71) Applicant: SPORTLOGIQ INC., Montreal (CA)

(72) Inventors: Mehrsan Roshtkhari Javan, Montreal (CA); Mengyao Zhai, Burnaby (CA); Gregory Peter Mori, Burnaby (CA)

(73) Assignee: Sportlogiq Inc., Montreal (CA)

( * ) Notice: Subject to any disclaimer, the term of this patent is extended or adjusted under 35 U.S.C. 154(b) by 0 days.

(21) Appl. No.: 15/926,721

(22) Filed: Mar. 20, 2018

(65) Prior Publication Data

US 2018/0211396 A1   Jul. 26, 2018

Related U.S. Application Data

(63) Continuation of application No. PCT/CA2016/051370, filed on Nov. 23, 2016.
(Continued)

(51) Int. Cl.
*G06K 9/00* (2006.01)
*G06T 7/246* (2017.01)
*G06T 7/215* (2017.01)
*G06T 7/207* (2017.01)
*G06T 7/277* (2017.01)

(52) U.S. Cl.
CPC .............. *G06T 7/248* (2017.01); *G06T 7/207* (2017.01); *G06T 7/215* (2017.01); *G06T 7/246* (2017.01); *G06T 7/277* (2017.01); *G06T 2207/10016* (2013.01); *G06T 2207/20012* (2013.01); *G06T 2207/20016* (2013.01);
(Continued)

(58) Field of Classification Search
CPC . G06T 7/248; G06T 3/40; G06T 2207/20016; G06T 2207/20081; G06T 2207/10016; G06T 7/215; G06F 3/017; G05D 1/0242; G06K 9/00805; G06K 9/4671; G06K 9/00597
See application file for complete search history.

(56) References Cited

U.S. PATENT DOCUMENTS 5,761,326 A * 6/1998 Brady .................... G08G 1/015
340/937
8,180,107 B2   5/2012 Broaddus et al.
(Continued)

OTHER PUBLICATIONS

Adam, A. et al; "Robust fragments-based tracking using the integral histogram"; 2006.
(Continued)

*Primary Examiner* — Amir Alavi
(74) *Attorney, Agent, or Firm* — Brett J. Slaney; Blake, Cassels & Graydon LLP (57) ABSTRACT

A system and method are provided for object tracking in a sequence of images of a scene acquired by an imaging device. The method includes generating a representation of an object and its surroundings; generating a tracking score based on the representation of the object and its surroundings, and a classification scheme; detecting a peak in the tracking score corresponding to a location of the object in the image; and adjusting the representation of the object and its surroundings and the classification scheme according to one or more new appearances of the object.

38 Claims, 10 Drawing Sheets

Related U.S. Application Data (60) Provisional application No. 62/260,284, filed on Nov. 26, 2015.

(52) U.S. Cl.
CPC .............. *G06T 2207/20081* (2013.01); *G06T 2207/20084* (2013.01); *G06T 2207/20104* (2013.01)

(56) References Cited

U.S. PATENT DOCUMENTS

| | | | |
|---|---|---|---|
| 8,929,597 B2* | 1/2015 | Huang | G06T 7/246 |
| | | | 382/103 |
| 9,576,185 B1* | 2/2017 | Delp | G06K 9/00201 |
| 9,947,106 B2* | 4/2018 | Le Clerc | G06K 9/00771 |
| 2008/0123900 A1 | 5/2008 | Ma et al. | |
| 2009/0041297 A1* | 2/2009 | Zhang | G06K 9/00362 |
| | | | 382/103 |
| 2009/0060352 A1 | 3/2009 | Distante et al. | |
| 2009/0087027 A1* | 4/2009 | Eaton | G06F 15/16 |
| | | | 382/103 |
| 2009/0296989 A1 | 12/2009 | Ramesh et al. | |
| 2012/0020524 A1* | 1/2012 | Ishikawa | H04N 7/183 |
| | | | 382/103 |
| 2013/0141597 A1* | 6/2013 | Lee | H04N 5/23219 |
| | | | 348/207.11 |
| 2013/0294651 A1* | 11/2013 | Zhou | G06K 9/00355 |
| | | | 382/103 |
| 2018/0211396 A1* | 7/2018 | Roshtkhari Javan | G06T 7/248 |

OTHER PUBLICATIONS

Krizhevsky, A. et al; "Imagenet classification with deep convolutional neural networks"; 2012.
Avidan, S.; "Ensemble tracking"; IEEE Transactions on Pattern Analysis and Machine Intelligence; vol. 29, No. 2, pp. 261-271;2007.
Avidan, S.; "Support vector tracking"; IEEE Transactions on Pattern Analysis and Machine Intelligence; vol. 26, No. 8, pp. 1064-1072; 2004.
Babenko, B. et al; "Robust object tracking with online multiple instance learning", IEEE Transactions on Pattern Analysis and Machine Intelligence; vol. 33, No. 8, pp. 1619-1632; 2011.
Collins, R. T. et al; "Online selection of discriminative tracking features", IEEE Transactions on Pattern Analysis and Machine Intelligence; vol. 27, No. 10, pp. 1631-1643; 2005.
Danelljan, M. et al; "Adaptive color attributes for real-time visual tracking"; 2014.
Dinh, T. B. et al; "Context tracker: Exploring supporters and distracters in unconstrained environments"; 2011.
Grabner, H. et al; "Semi-supervised on-line boosting for robust tracking"; 2008.
Hare, S. et al; "Struck: Structured output tracking with kernels"; 2011.
Jepson, A. D. et al; "Robust online appearance models for visual tracking", IEEE Transactions on Pattern Analysis and Machine Intelligence; vol. 25, No. 10, pp. 1296-1311; 2003.
Zhang, K. et al; "Real-time object tracking via online discriminative feature selection", IEEE Transactions on Image Processing; vol. 22, No. 12, pp. 4664-4677; 2013.
Kalal, Z. et al; "P-N learning: Bootstrapping binary classifiers by structural constraints"; 2010.
Kwon, J. et al; "Visual tracking decomposition"; 2010.
Nummiaro, K. 2003 et al; "An adaptive color-based particle filter"; Image and Vision Computing; vol. 21, No. 1, pp. 99-110; 2003
Oron, S. et al; "Locally orderless tracking"; 2012.
Possegger, H. et al; "In defense of color-based model-free tracking"; 2015.
Ross, D. A. et al; "Incremental learning for robust visual tracking"; International Journal of Computer Vision; vol. 77, No. 1-3, pp. 125-141; 2008.
Zhang, T. et al; "Structural sparse tracking"; 2015.
Yang, H. et al; "Recent advances and trends in visual tracking: A review"; Neurocomputing; vol. 74, No. 18, pp. 3823-3831; 2011.
Henriques, J. F. et al; "High-speed tracking with kernelized correlation filters"; IEEE Transactions on Pattern Analysis and Machine Intelligence; vol. 37, No. 3, pp. 583-596; 2015.
Wu, Y. et al; "Online object tracking: A benchmark"; 2013.
Zhang, K. et al; "Real-time compressive tracking"; 2012.
Wang, N. et al; "Transferring rich feature hierarchies for robust visual tracking"; 2015.
Ma, C. et al; "Hierarchical convolutional features for visual tracking"; Proceedings of the IEEE International Conference on Computer Vision; pp. 3074-3082; 2015.
Qi, Y. et al; "Hedged deep tracking"; 2016.
L. Wang, W. Ouyang, X. Wang, and H. Lu, "Visual tracking with fully convolutional networks," in Proceedings of the IEEE International Conference on Computer Vision, 2015, pp. 3119-3127.
Al-Saber, Enji; International Search Report from corresponding PCT Application No. PCT/CA2016/051370; search completed Mar. 20, 2017.

* cited by examiner

| Method | Precision Score | Success Score |
|---|---|---|
| GDT(Disclosed Method) | 0.841 | 0.613 |
| FCNT [27] | 0.856 | 0.599 |
| HCFT [25] | 0.891 | 0.605 |
| HDT [26] | 0.889 | 0.603 |
| SO-DLT [24] | 0.819 | 0.602 |
| KCF [23] | 0.742 | 0.517 |
| Struck [10] | 0.656 | 0.474 |
| TLD [13] | 0.608 | 0.437 |
| CXT [8] | 0.575 | 0.426 |

Precision plots for scale variation (SV) attribute

FIG. 8(b)

Success plots for scale variation (SV) attribute

FIG. 9(b)

Success plots for low resolution (LR) attribute

FIG. 9(a)

Precision plots for low resolution (LR) attribute

SYSTEMS AND METHODS FOR OBJECT TRACKING AND LOCALIZATION IN VIDEOS WITH ADAPTIVE IMAGE REPRESENTATION

CROSS-REFERENCE TO RELATED APPLICATION(S)

This application is a continuation of PCT Application No. PCT/CA2016/051370 filed on Nov. 23, 2016, which claims priority to U.S. Provisional Patent Application No. 62/260,284 filed on Nov. 26, 2015, the contents of both incorporated herein by reference.

TECHNICAL FIELD

The following relates to systems and methods for detecting, localizing and tracking an object of interest in videos, particularly in the field of computer vision.

DESCRIPTION OF THE RELATED ART

Visual object tracking is considered a fundamental task in computer vision and vision-based analysis. High level video analysis applications typically require the objects of interest to be tracked over time. Single object tracking is a well-researched topic for which a diverse set of approaches and a rich collection of algorithms have been produced to date. Tracking can be considered an almost solved problem when objects in a scene are isolated and easily distinguishable from the background, however the problem is still challenging in real world applications because of occlusions, cluttered backgrounds, fast and abrupt motions, dramatic illumination changes, and large variations over the viewpoint and poses of the target. Readers may refer to [20] and [21] for a review of the state-of-the-art in object tracking and a detailed analysis and comparison of various representative methods.

In general, single target tracking algorithms consider a bounding box around the object in the first frame and automatically track the trajectory of the object over the subsequent frames. Therefore, the single target tracking approaches are usually referred to as "generic object tracking" or "model-free tracking", in which there is no pre-trained object detector involved [6, 19, 18]. Model free visual object tracking is a challenging problem from the learning perspective, because only a single instance of the target is available in the first frame and the tracker learns the target appearance in the subsequent frames. In almost all of the previously reported algorithms, the object itself and/or its background are modeled using a local set of hand-crafted features. Those features can be based either on the intensity or texture information [10, 22, 8, 13] or color information [7, 17, 16, 15]. Those feature vectors are then employed either in a generative [1, 14, 11, 22] or discriminative [5, 3, 6, 9, 13, 4] inference mechanism in order to detect and localize the target in the following frame. It has been demonstrated that the most important part of a tracking system is representative features [12].

Accordingly, within the prior attempts, most of the reported tracking approaches rely either on robust motion or appearance models of each individual object using a fixed set of predefined features. Although the currently used features produce acceptable tracking results, it is preferred to leverage more descriptive features by incorporating an adaptive image representation mechanism based on machine learning techniques.

SUMMARY

The following provides a method to exploit object-specific representations throughout a learning process during the object tracking procedure. Methods and systems are herein described, including computer programs encoded on computer storage media, for locating an object of interest in a sequence of frames of a video.

The object is represented by a high dimensional representation and a tracking score can be computed by a combination of weak classifiers. The weak classifiers separate pixels that are associated with the object from pixels that are associated with the background. The object representation and weak classifiers are adaptively updated in every image frame containing a new observation. This can be done to ensure that the tracking system adaptively learns the appearance of the object in successive frames. The tracking system generates the tracking scores for the possible locations of the object in the image frame, the location with the highest score being considered as the new location of the object.

In one aspect, there is provided a method of object tracking in a sequence of images of a scene acquired by an imaging device, the method comprising: generating a representation of an object and its surroundings; generating a tracking score based on the representation of the object and its surroundings, and a classification scheme; detecting a peak in the tracking score corresponding to a location of the object in the image; and adjusting the representation of the object and its surroundings and the classification scheme according to one or more new appearances of the object.

In other aspects there are provided systems and computer readable media for performing the above method.

BRIEF DESCRIPTION OF THE DRAWINGS

Embodiments will now be described by way of example only with reference to the appended drawings wherein.

DETAILED DESCRIPTION

An implementation of the systems and methods described herein uses a sequence of images to continuously detect, localize and track an object of interest in the consecutive frames from a single initial observation of the object. The following describes the use of adaptively learning a representative object representation for the purpose of tracking.

In the following, an object is detected and localized in a consecutive set of images, given an initial detection and localization of the object in the first image.

The following relates to object tracking with visual information, and particularly to tracking an object without prior knowledge about objects that are being tracked. This system learns the correct representative image representation for the object and its surroundings in order to adapt itself to the changes in the object appearance in the following frames.

In an implementation of the system, the system is configured for object tracking by adaptively adjusting the image representations and classifiers to detect and localize the object. The processes used in such an implementation are directed to creating a long-term trajectory for an object of interest in the scene by using a model-free tracking algorithm. In this implementation, the process is based on the automatically learned appearance model of the object and adaptively updating the classification scheme to detect and localize the object.

In one aspect, there is provided a method of tracking an object in a scene in which the appearance model is initially learned and only the classifier itself is adaptively adjusted based on new observations. In another aspect, the appearance model is adaptively adjusted while the classification scheme is fixed. In yet another aspect, both classifier and image representations are adjusted in a unified procedure. In yet another aspect, the classifier and image representations are adaptively adjusted throughout an iterative optimization procedure.

Accordingly, there is provided a new deep learning based tracking architecture that can effectively track a target given a single observation. There is provided a unified deep network architecture for object tracking in which the probability distributions of the observations are learnt and the target is identified using a set of weak classifiers (e.g. Bayesian classifiers) which are considered as one of the hidden layers. In addition, the following CNN-based system and method can be fine-tuned to adaptively learn the appearance of the target in successive frames. Experimental results indicate the effectiveness of the proposed tracking system.

As presented in [24], in which the authors have developed a structured output CNN for the single target tracking problem, the algorithm processes an input image and produces the probability map (aggregated over multiple scales) of every pixel that belongs to the target that is being tracked. It is then followed by an inference mechanism to detect and localize the target. In other words, the proposed architecture for deep network based tracking produces a pixel-wise probability map for the targetness and hence, the network is considered as a generative model which estimates the likelihood of the target. Alternatively, in the present system a classification-based tracking scheme is provided in which, rather than assigning a targetness probability to each pixel, the target is being identified as a region which has the maximum classification score given the learned models for both positive and negative regions. By employing a weak classifier, e.g., a Bayesian classifier, as a loss layer in the CNN tracker, one can update the network parameters in online tracking in order to account for the target appearance variations over time.

Figure 1:
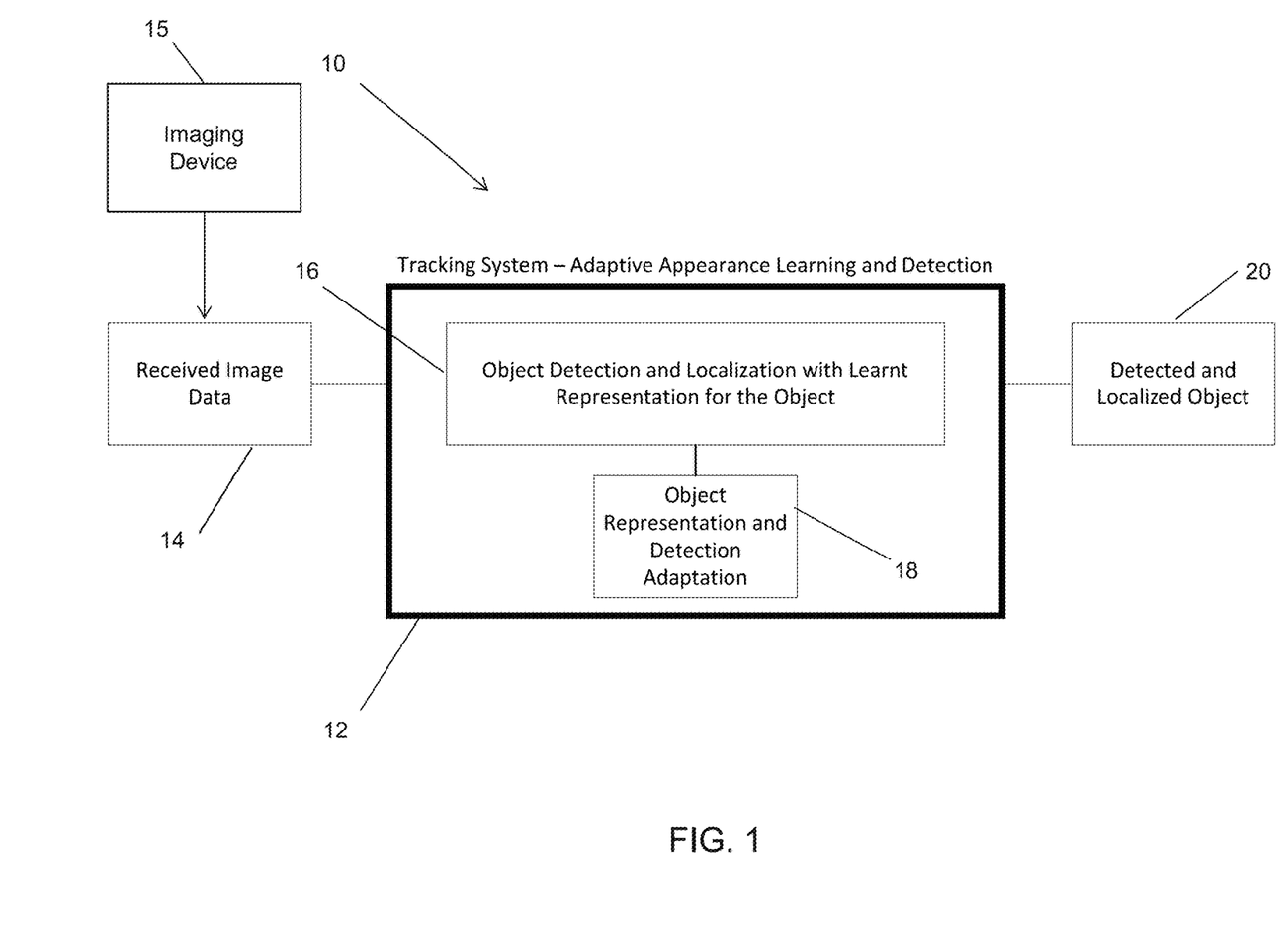
FIG. 1 is a schematic block diagram of a system for object tracking by continuously learning a representation of the object being tracked in a unified representation and localization process.

Turning now to the figures, FIG. 1 is an example of a process for object tracking by continuously learning an appropriate representation of the object to be tracked in a unified representation and localization process. The system 10 shown in FIG. 1 includes a tracking system 12, which receives images and/or video data 14 from an imaging device 15, e.g., for tracking objects in a video. The tracking system 12 includes or otherwise operates as an adaptive appearance learning and detection/classification module to process received image data 14 and to determine at least one detected and localized object 20 in the image/video. The module 12 performs object detection and localization at 16, which learns a representation for the object which is tracked. This is done using an object representation and detection adaptation at 18. The system 10 is an example of a system implemented as a computer program in one or more computers in which the systems, components, modules, and techniques described below can be implemented.

Figure 2:
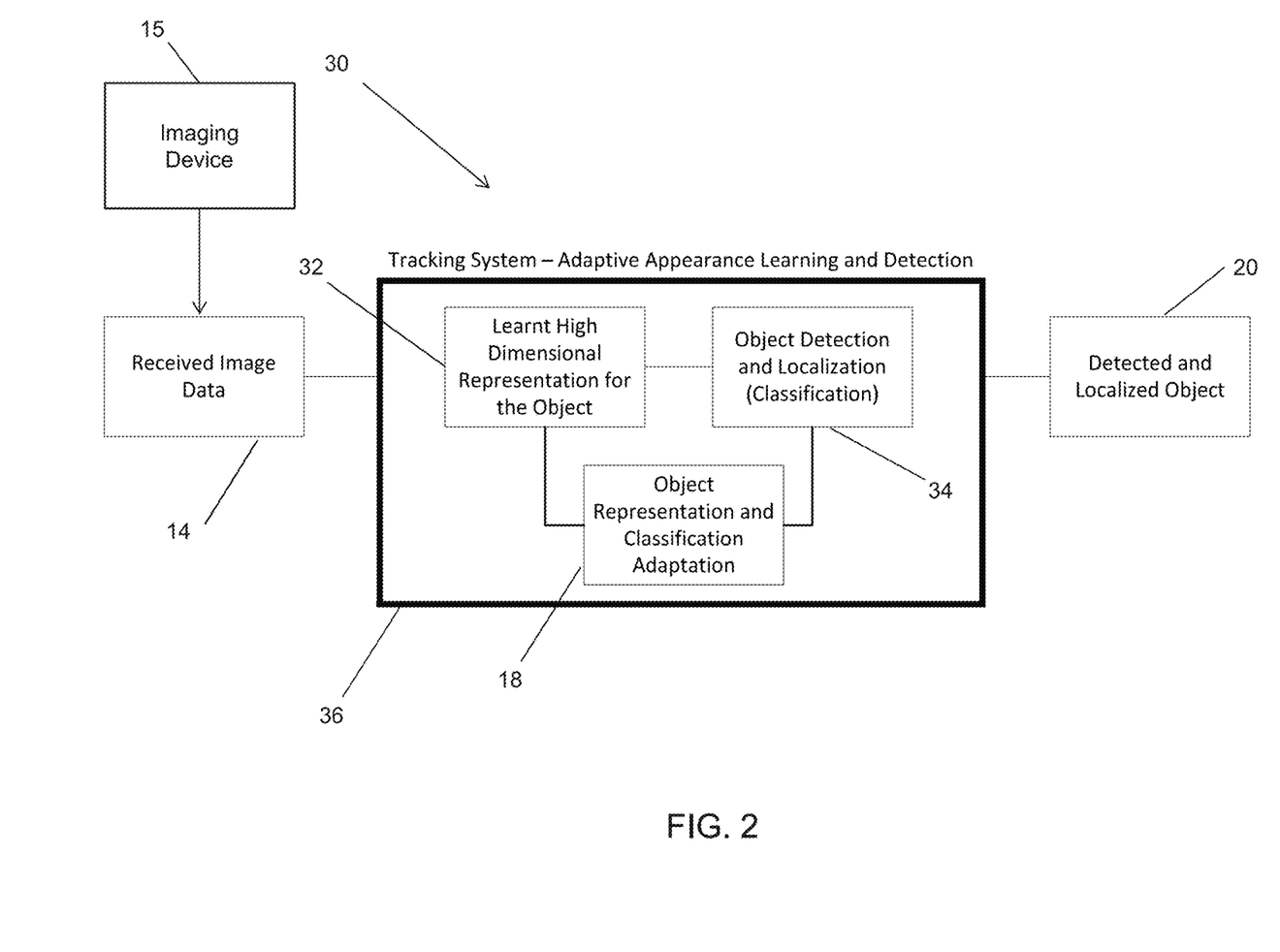
FIG. 2 is a schematic block diagram of a system for object tracking by continuously learning an appropriate representation of the object and adaptation of the classifier to the new observations in a separate representation and classification process.

FIG. 2 illustrates an example of a process for object tracking that operates by continuously learning an appropriate representation of the object and adaptation of the classifier to the new observations in a separate representation and classification process. As shown in FIG. 2, a tracking system 30 in this example uses a learning and detection module 36 that uses a learnt high dimensional representation for the object at 32, an object detection and localization (i.e. a classification) at 34 and the object representation and classification adaptation at 18 to generate the detected and localized output 20.

Figure 3:
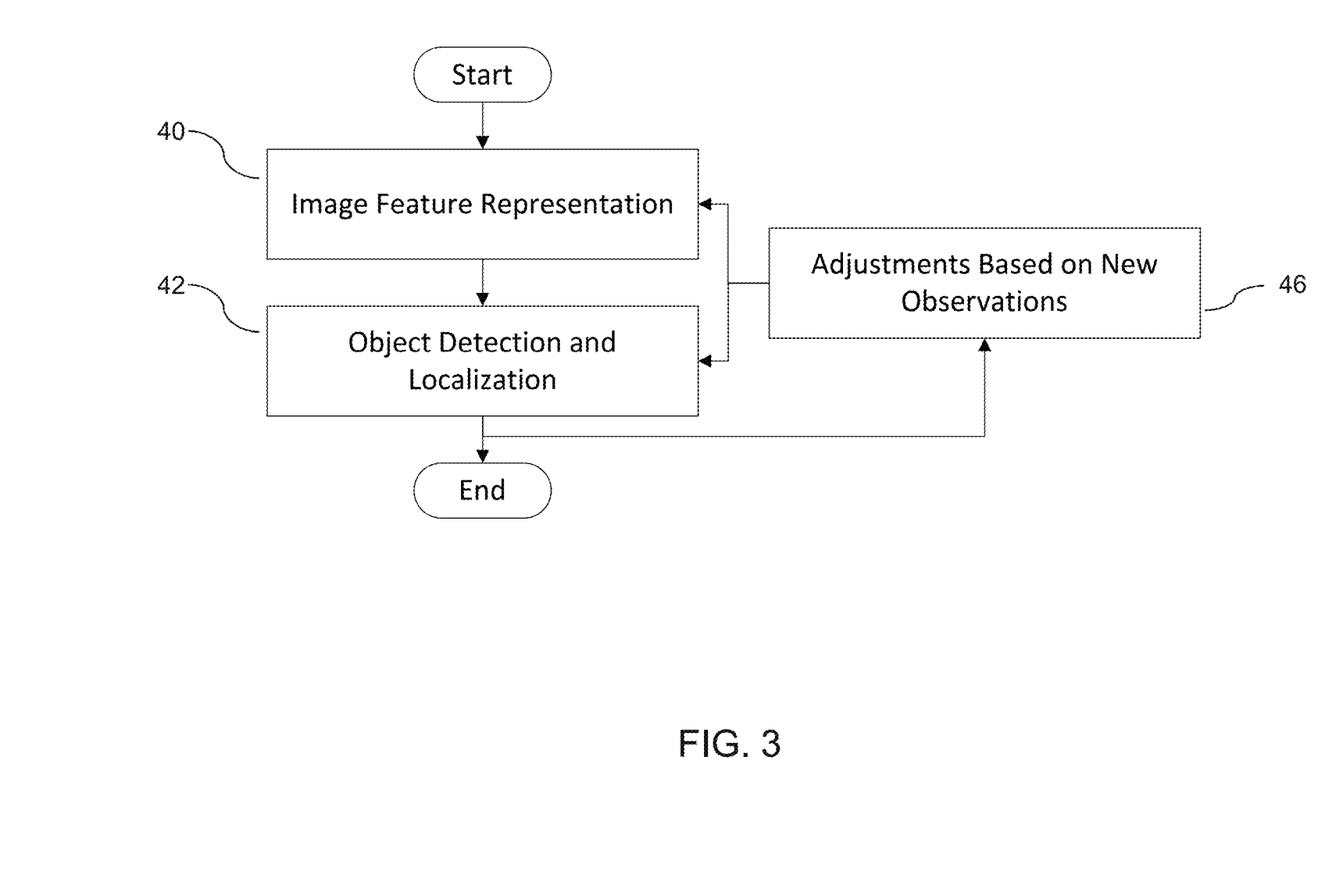
FIG. 3 is a flow diagram illustrating a process for simultaneously adjusting the object representation and its surroundings and the detection and localization mechanism based on new observations.

FIG. 3 illustrates a flow diagram of a process that can be used for simultaneously adjusting the object representation and its surroundings, and the detection and localization mechanism, based on new observations. When the process begins, an image feature representation is obtained at 40 and object detection and localization performed at 42. Adjustments are continuously made based on new observations at 46.

Figure 4:
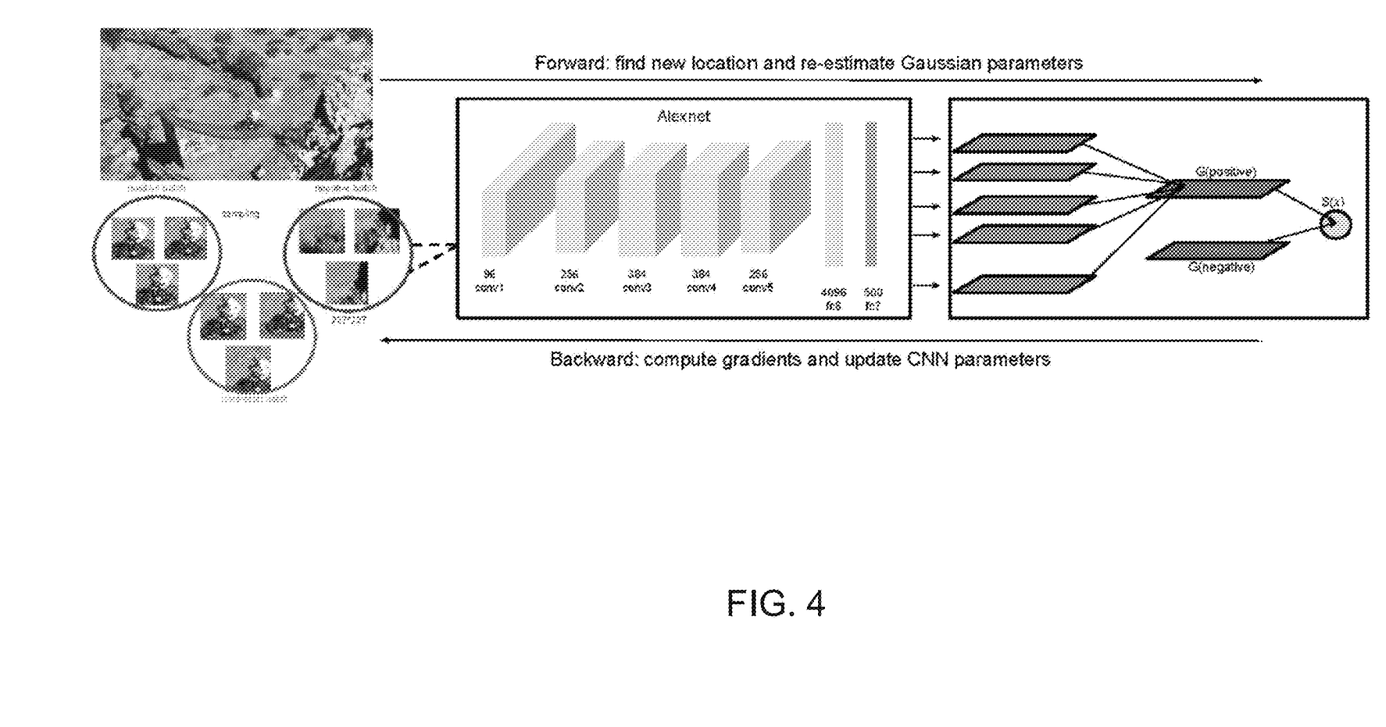
FIG. 4 is a schematic diagram of an example using convolutional neural networks for object representation, detection and localization combined with Gaussians Mixture Models (GMM) to estimate distributions of the positive (object related) and negative (background related) representative features learned by the network.

FIG. 4 provides an exemplary illustration of an application of the system 10, 30, which uses convolutional neural networks for object representation, detection and localization combined with Gaussians Mixture Models (GMM) to estimate distributions of the positive (object related) and negative (background related) representative features learned by the network. The final decision is made by a naive Bayes classifier to estimate the true location of the target in the following frame. The network is adjusted based on the object appearance in the first frame. This results in a network that can discriminate the object from the surroundings. The adaptive adjustment process uses an expectation-maximization approach to adapt the image representation and classifiers to the target appearance changes by updating both network and GMM parameters.

The exemplary embodiment in FIG. 4 discloses a classification-based tracking scheme in which the object representation, detection and localization (classification) are being adjusted based on new observations of the tracked object. This exemplary embodiment employs a Bayesian classifier as a loss layer in a convolutional neural network (CNN) [2] in order to automatically learn an image representation. An iterative expectation-maximization process is employed in order to update the network parameters and classifiers to account for the target appearance variations over time.

FIG. 4 shows the overall architecture of an exemplary embodiment of the disclosed tracking system. Considering the network architecture presented in FIG. 4, the objective is to train a discriminative model to learn the object appearance given a single observation and distinguish it from the background. Given an input image, similar to the tracking by detection methods the output of the tracking system is a classification score of a discriminative appearance based classifier. S (x) defines the classification score of an observation, x, to be considered as a target.

This exemplary embodiment uses a convolutional neural network architecture presented in FIG. 4. This network adopts an AlexNet CNN model as its basis, described in [2]. This network consists of five convolutional layers and two fully connected layers. The implementation adopts the pre-trained model, which is trained for image classification and hence, should be fine-tuned for tracking.

It should be noted that the tracking system is independent of the choice of the convolutional neural network architecture and the image representation methods. Accordingly, the example processes described herein are for illustrative purposes and similarly operable processes could instead be used. In addition, the automatically learned image representations could be replaced by any representative approach.

Assume that $x=[x_1, x_2, \ldots, x_N]^T$ is the vector representing the output of second fully connected layer in the CNN (highlighted plane in FIG. 4). It can be considered as a feature vector representing each image patch. Given the probability distributions of the negative and positive examples, the discriminative classifier for target detection and localization can be modeled using a naive Bayes classifier:

$$S(x) = \log\left(\frac{P(x \mid pos)P(pos)}{P(x \mid neg)P(neg)}\right) \quad (1)$$

Assume that the prior probabilities of the positive and negative labels are equal and features are independent. Then (1) is rewritten as:

$$S(x) = \log\left(\prod_{i=1}^{n} \frac{P(x_i \mid pos)}{P(x_i \mid neg)}\right) \quad (2)$$

It is assumed that the distributions of the positive and negative examples' features can be represented by Gaussian Mixture Models (GMM). One may assumed that the distribution of the posterior possibility of the positive examples, P(x|pos), obey a single Gaussian distribution denoted by $G_{pos}$. This can be replaced by multiple Gaussian distributions. In addition, the principles discussed herein are not limited to the Gaussian distribution of the image features and any alternative probability distribution approximation method can be used. Therefore:

$$G_{pos} = P(x \mid pos) = \prod_{i=1}^{N} \frac{1}{\sqrt{2\pi}\,\sigma_{pos_i}} e^{-\frac{(x_i - \mu_{pos_i})^2}{2\sigma_{pos_i}^2}} \quad (3)$$

where $\mu_{pos_i}$ and $\sigma_{pos_i}$ are the mean and variance of the Gaussian distribution of the $i^{th}$ attribute of the positive feature vector, $x_i$, respectively. Generally, negative examples show more diverse appearance and shape as compared to the positive examples because they are being sampled from different regions in the image. Therefore, the posterior distribution of the negative examples, P(x|neg), is assumed to be estimated by a Gaussian mixture model with K components, described as follows:

$$G_{neg} = P(x \mid neg) = \prod_{i=1}^{N} \sum_{j=1}^{K} \phi_j \frac{1}{\sqrt{2\pi}\,\sigma_{neg_{i,j}}} e^{-\frac{(x_i - \mu_{neg_{i,j}})^2}{2\sigma_{neg_{i,j}}^2}} \quad (4)$$

where $\phi_j$, $\mu_{neg_{i,j}}$ and $\sigma_{neg_{i,j}}$ are the prior, mean and variance of the ith attribute of the negative feature vector, $x_i$, for the jth Gaussian in the GMM, respectively.

The image representation learning of the pre-trained network is carried out through two phases, offline and online fine-tuning stages. The pre-trained network is originally trained for an image classification task, and hence, it does not suitably represent the appearance of a specific target. Therefore, it should not be used directly for a tracking task. Given a pre-trained model, it is fine-tuned twice in order to reach two objectives: localizing a generic target in the image and learning the appearance of the specific target of interest, given a single example.

For object tracking tasks, the objective is to precisely localize the target in a given frame. In practice, there are usually not enough examples available to train a deep network to recognize and localize the target. In order to learn the generic feature for targets and be able to distinguish an object from the background, 100,000 auxiliary images data from the ImageNet 2014 detection dataset (http://image-net.org/challenges/LSVRC/2014/) are used. The fine-tuned CNN can now be considered as a generic feature descriptor of objects, but it still should not be used for tracking because it has been found to not be capable of discriminating a specific target from other objects in the scene. In other words, this network is equally activated for any object in the scene. Therefore, another phase of fine-tuning is conducted given the bounding box around the target in the first frame.

The input to the tracking algorithm is a single bounding box in the first frame of a tracking clip, which can be achieved by either running a detector or manual labeling. Given such a bounding box, a sampling scheme can be used to sample some positive patches around the original object and some negative patches with no overlap with positive ones. Therefore, the probability density functions of the positive and negative examples are computed using (3) and (4). When a new frame comes, some possible locations around the previous location of the target with a predefined search radius are sampled. The search radius is a function of the initial size of the target. The sampling is done at multiple scales by building an image pyramid and a set of candidate bounding boxes is generated which is referred to as X. Given a candidate bounding box in the frame, $x_i \in X$, the tracking score is computed as:

$$S(x_i) = \log(G_{pos}(x_i)) - \log(G_{neg}(x_i)) \quad (5)$$

The candidate bounding box which has the highest tracking score is then taken to be the new true location of the object:

$$x^* = \arg\max_{x_i \in X} S(x_i) \quad (6)$$

Once the true target bounding box is determined in the following frame, the whole network shall be adjusted again in order to adapt itself to the new target appearance. This procedure is carried out as an expectation-maximization (E-M) process to update the network and optimize the tracking score.

Updating Gaussian Parameters

The Gaussian classifiers and their parameters, means and variances are updated using the new prediction x*. Given location of x*, positives and negatives are sampled again. Assume that means and variances for positives are re-estimated as $\mu_{pos}$* and $\sigma_{pos}$*. Then the means and variances are updated according to the following equations:

$$\mu_{pos_i} = \gamma \mu_{pos_i} + (1-\gamma)\mu_{pos_i}* \quad (7)$$

$$\sigma_{pos_i}^2 = \gamma \sigma_{pos_i}^2 + (1-\gamma)\sigma_{pos_i*}^2 + \gamma(1-\gamma)(\sigma_{pos_i} - \sigma_{pos_i}*)^2 \quad (8)$$

where $\gamma$ is the learning rate. Similarly, the means and variances for the GMM representing negative examples are updated as follows:

$$\mu_{neg_{i,j}} = \gamma \mu_{neg_{i,j}} + (1-\gamma)\mu_{neg_{i,j}}* \quad (9)$$

$$\sigma_{neg_{i,j}}^2 = \gamma \sigma_{neg_{i,j}}^2 + (1-\gamma)\sigma_{neg_{i,j}*}^2 + \gamma(1-\gamma)(\sigma_{neg_{i,j}} - \sigma_{neg_{i,j}}*)^2 \quad (10)$$

Instead of using a constant learning rate, $\gamma$, an adaptive learning rate is employed here. The adaptation mechanism is based on the history of the tracking score and the degree of similarity of the target appearance between the current frame and the previous one.

Updating the Network Weights

Given feature x extracted from an image patch, the corresponding tracking score is computed by (5). Therefore, it is expected that the tracking score is maximized for positive examples while being minimized for the negative ones. In order to update the network weights, the gradients of the $i^{th}$ element of x are computed as follows:

$$\frac{\partial S}{\partial x_i} = \frac{\partial(\log(G_{pos}(x)) - \log(G_{neg}(x)))}{\partial x_i} \quad (11)$$

$$\frac{\partial \log(G_{pos}(x))}{\partial x_i} = -\frac{x_i - \mu_{pos_i}}{\sigma_{pos_i}^2}$$

$$\frac{\partial \log(G_{neg}(x))}{\partial x_i} = -\sum_{j=1}^{K} \phi_j \frac{e^{-\frac{(x_i - \mu_{neg_{i,j}})^2}{2\sigma_{neg_{i,j}}^2}}}{\sqrt{2\pi}\sigma_{neg_{i,j}}^3} \frac{x_i - \mu_{neg_{i,j}}}{G_{neg_i}}$$

Eventually, the gradients in one batch are computed as follows:

$$\frac{\partial S}{\partial x_i} = \sum_{j=1}^{M} \frac{\partial S}{\partial x_i^j} \quad (12)$$

Where M is the batch size and $x_i^j$ is the $i^{th}$ element of the $j^{th}$ image, $x^j$ in one batch.

To avoid updating the parameters aggressively, during online tracking the parameters are only updated if the tracking system is confident about the new appearance of the target. In summary, the online tracking algorithm is an expectation-maximization optimization algorithm (EM).

In summary, the tracking algorithm described herein provides a two-stage iterative process in which the network parameters are updated to maintain the distributions of negative and positive examples. The algorithm starts with an initial set of means and variances estimated from the bounding boxes in the first frame. Then, when a new frame arrives, the following steps are performed:

Forward—Stage 1. In the forward procedure of the CNN, given a fine-tuned neural network, the new location which has the highest score is found and the Gaussian parameters re-estimated. Estimation of the Gaussian parameters is a deterministic procedure which uses maximum likelihood estimation.

Backward—Stage 2. In the backward procedure of the CNN, the Gaussian parameters are fixed and the gradients of the tracking score S, with respect to x, are computed in order to propagate tracking error to the network and update the CNN parameters. With back propagation, only fully connected layers are updated.

In order to evaluate the performance of the adaptive learning based tracker, extensive experiments carried out on challenging datasets using the CVPR13 "Visual Tracker Benchmark" dataset [21]. It contains 50 video sequences from complex scenes and covers a diverse set of visual attributes including illumination variation (IV), occlusion (OCC), scale variation (SV), deformation (DEF), motion blur (MB), fast target motion (FM), in-plane and out of plane rotations (IPR and OPR), out-of-view (OV), background clutter (BC), and low resolution videos (LR). All parameters have been set experimentally, but all have remained identical for all sequences. Quantitative comparisons with state-of-art methods have also been performed. One can follow the "Visual Tracker Benchmark" protocol introduced in [21] in order to compare the tracking accuracy to the state-of-the-art.

Following the evaluation protocol in [21], the experimental results are illustrated in terms of both precision plot and success plot. The precision plot shows the percentage of the number of frames in which the target is tracked. The center location error between the tracked target and ground truth is measured at different threshold values. The representative precision score is computed at the threshold value equal to 20 pixels. Similarly, the success plot shows the percentage number of frames in which the target is successfully tracked. This is done by measuring the overlap ratio of a prediction bounding box with the ground truth one as the intersection over union, and applying different threshold values between 0 and 1.

Figure 5A:
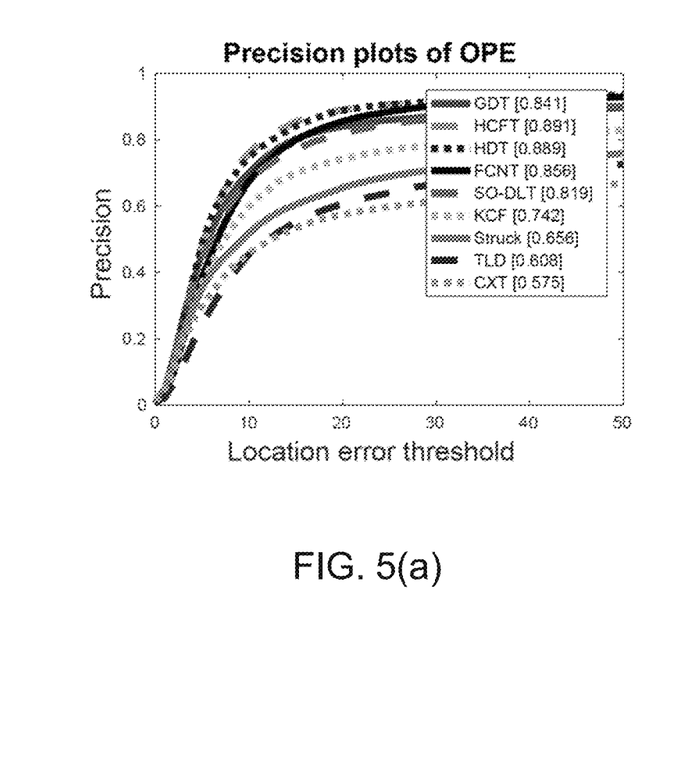
FIGS. 5(a) and 5(b) demonstrate the quantitative results in terms of precision and success plots of the disclosed tracking system in comparison with various state of the art tracking algorithms.
Figure 5B:
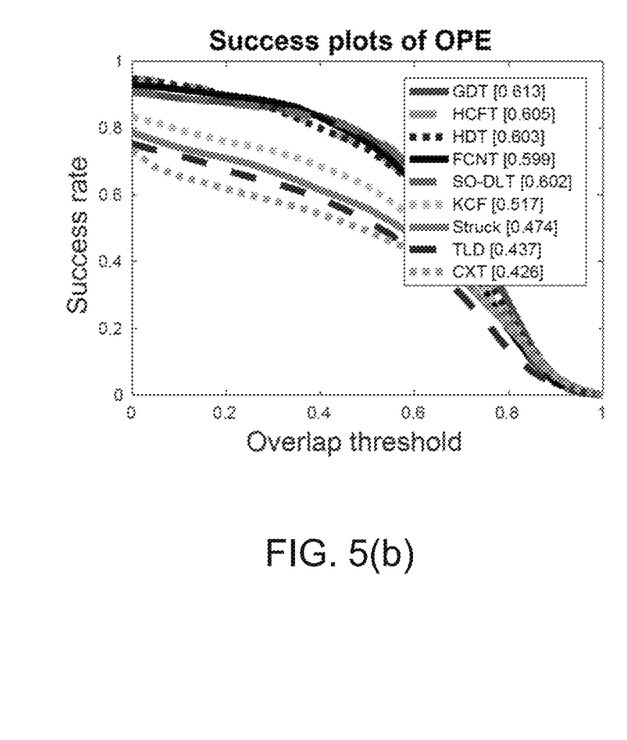

The tracking results are quantitatively compared with the eight state state-of-the-art tracking algorithms with the same initial location of the target. These algorithms are tracking by-detection (TLD) [13], context tracker (CXT) [8], Struck [10], kernelized correlation filters (KCF) [20], structured output deep learning tracker (SO-DLT) [24], fully convolutional network based tracker (FONT) [27], hierarchical convolutional features for visual tracking (HCFT) [25], and hedged deep tracking (HDT) [26]. The results are reported according to the "Visual Tracker Benchmark" [21]. The first four algorithms are often considered among the best trackers in the literature which use hand-crafted features, and the last four are among best approaches for CNN-based tracking. FIG. 5 shows the success and precision plots for the entire set of 50 videos in the "Visual Tracker Benchmark". Overall, the disclosed tracking algorithm (referred to as GDT in the figures) performs favorably against the other state-of-the art algorithms on all tested sequences. It has been found during these tests to outperform the state-of-the-art approaches given success plot and produces favorable results compared to other deep learning based trackers given precision plot, specifically for low location error threshold values. The current system achieved the following tracking scores on the whole set of 50 videos:

| | |
|---|---|
| Success Rate Score | 0.841 |
| Precision Score | 0.613 |

Figure 6:
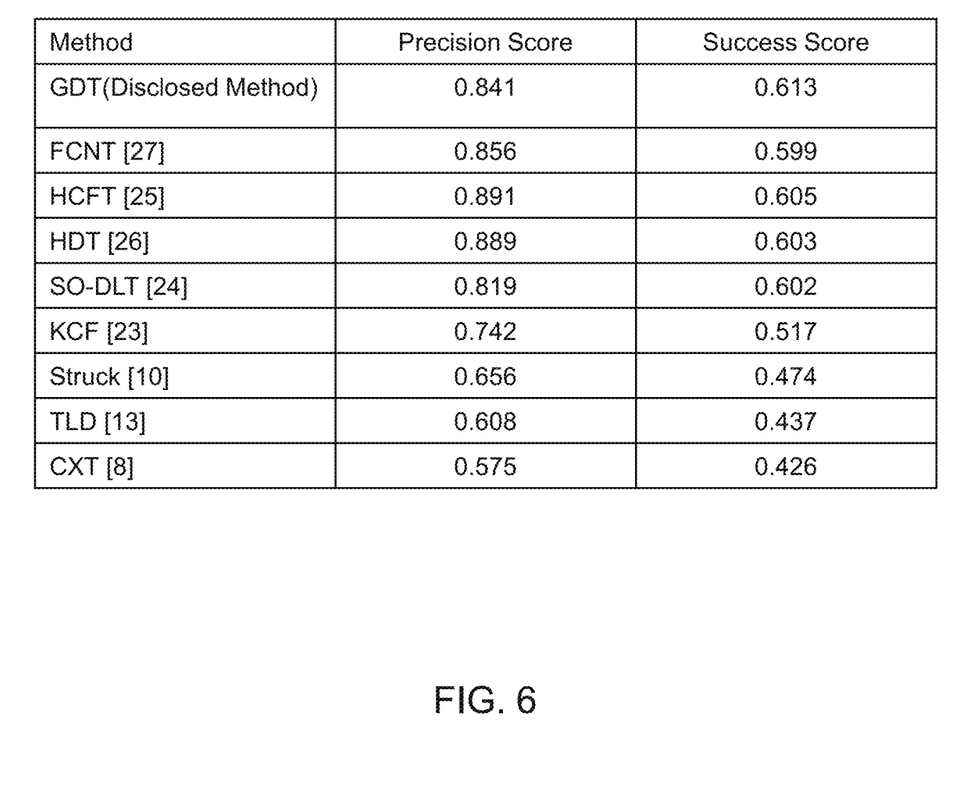
FIG. 6 demonstrates the quantitative results of the disclosed tracking system in comparison with various state of the art tracking algorithms shown in the charts in FIG. 5.

FIG. 6 summarizes the tracking scores for state-of-the-art trackers, the reported results being precision and success scores. In order to have a more detailed comparison, the success rate and precision scores are reported for different tracking attributes in FIG. 7. The visual attributes illustrated in FIG. 7 include illumination variation (IV), occlusion (OCC), scale variation (SV), deformation (DEF), motion blur (MB), fast target motion (FM), in-plane and out of plane rotations (IPR and OPR), out-of-view (OV), background clutter (BC), and low resolution videos (LR).

As noted above, FIG. 5 shows the success and precision plots for the entire set of 50 videos in the dataset. Overall, the proposed tracking algorithm performs favorably against the other state-of-the art algorithms on all tested sequences. It can be observed that the presently described algorithm also outperforms all of the state-of-the-art approaches given success plot and produces favourable results compared to other deep learning-based trackers given precision plot, specifically for low location error threshold values.

Figure 7A:
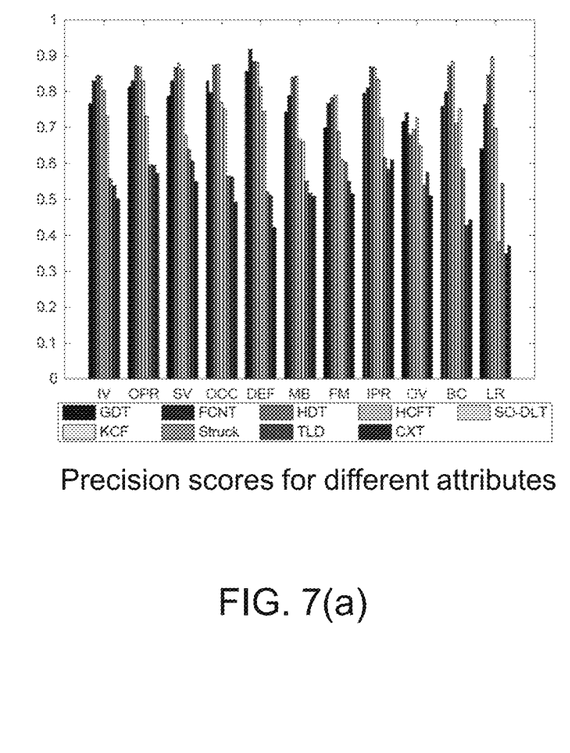
FIGS. 7(a) and 7(b) show the success rate and precision scores are for different visual tracking attributes according to the "Visual Tracker Benchmark" [21]
Figure 7B:
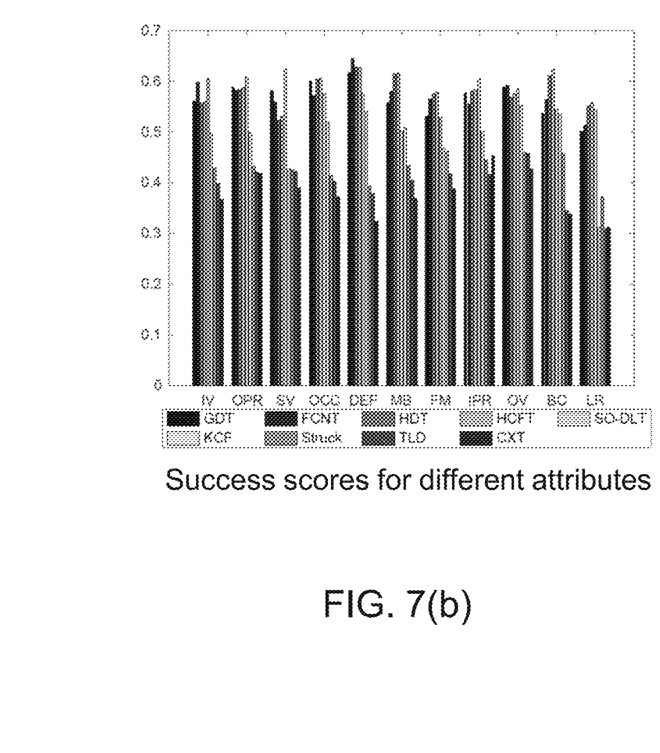

In order to have a more detailed comparison, the success rate and precision scores are reported for different tracking attributes in FIG. 7. It can be seen that the proposed tracker outperforms all of the non-deep learning based tracking systems in the studied attributes. The state-of-the-art deep learning based trackers, FONT and SO-DLT, show similar performance in some attributes and the other two deep learning based trackers, HDT and HCFT, show better performance in most attributes. While both HDT and HCFT trackers take advantage of multiple convolutional layers when compared to the present algorithm, despite their high accuracy in terms of precision, their success score is found to be lower than the present algorithm.

Figure 8A:
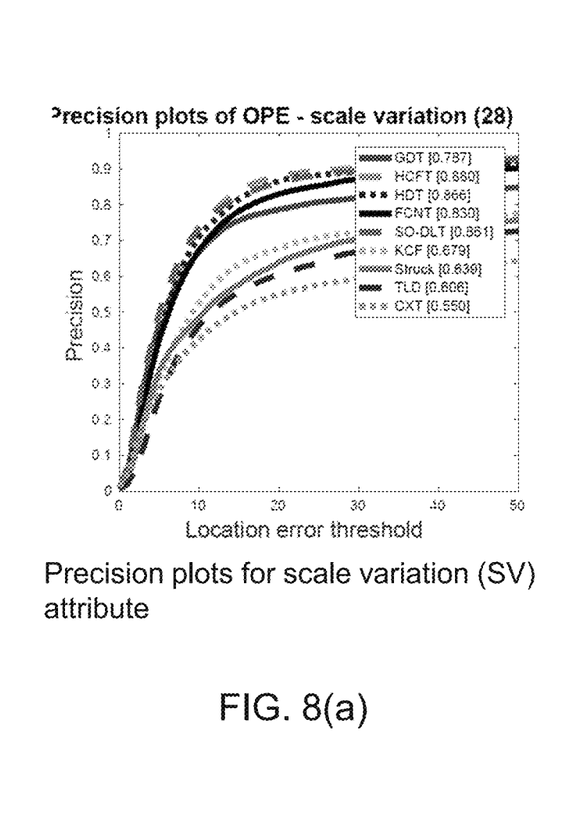
FIGS. 8(a) and 8(b) demonstrate precision and success plots for a scale variation (SV) attribute.
Figure 8B:
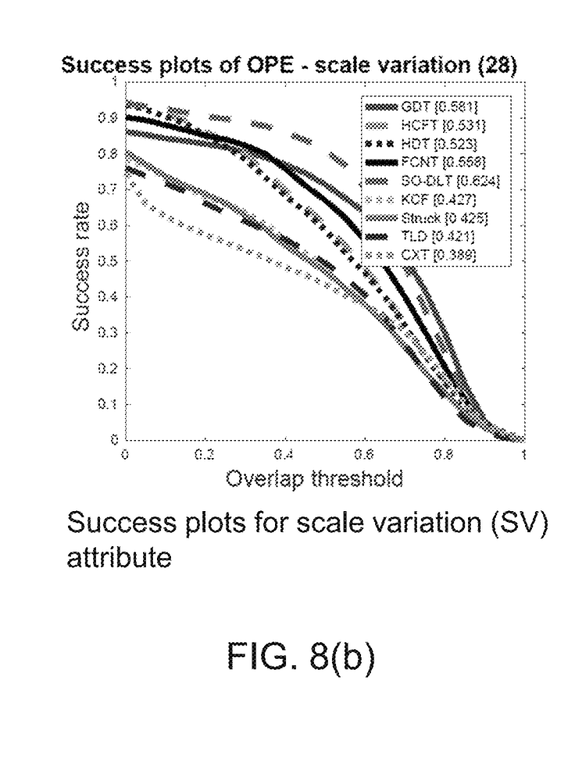
Figure 9A:
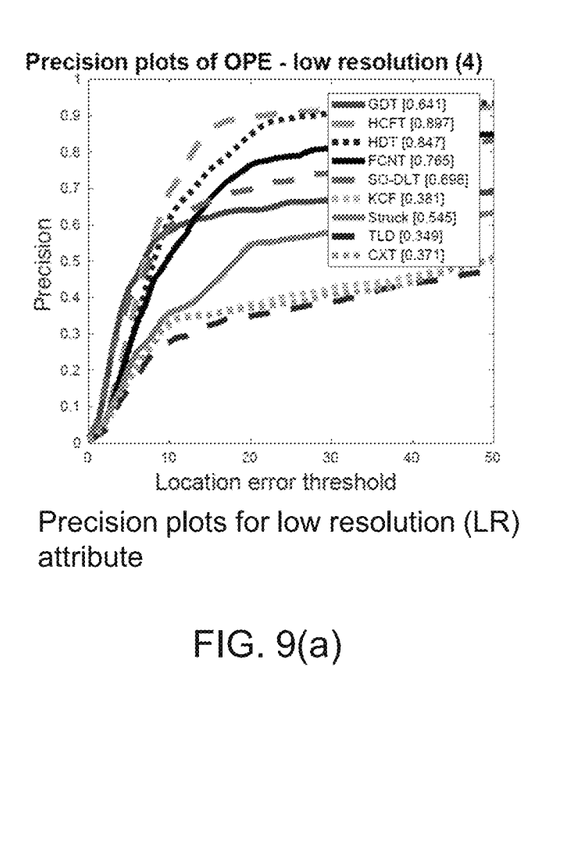
FIGS. 9(a) and 9(b) demonstrate precision and success plots for a low resolution (LR) attribute.
Figure 9B:
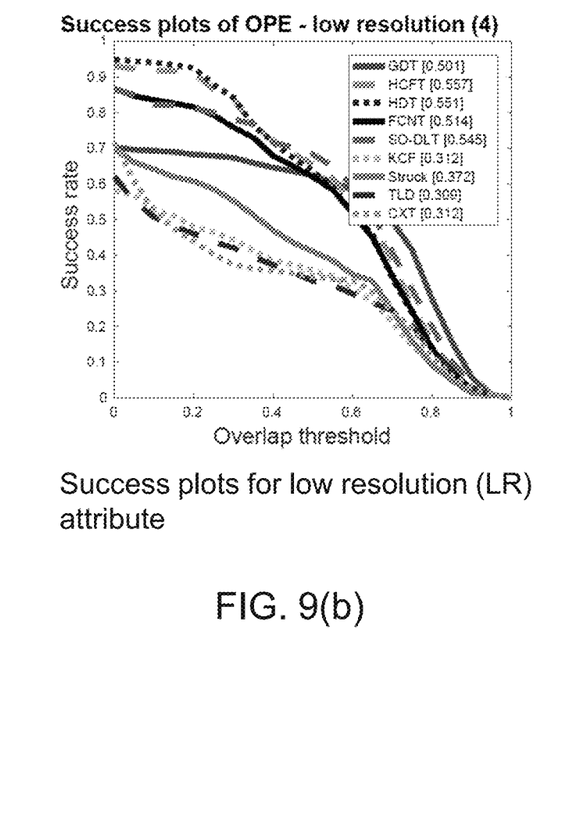

More specifically, the present algorithm can localize the target with a higher accuracy in the out-of-view (OV) test scenario where the target is invisible for a long period of time. This can account for implementations in which the object location is not estimated, but instead where object locations and scales are treated as a whole, while inferring object locations from each convolutional layers. This is more apparent in the scale variation (SV) and low resolution (LR) attributes where the success scores drop dramatically compared with the precision scores (see FIGS. 8 and 9). Given the success and precision plots for the LR attribute, it can be observed that the present tracking algorithm has a higher accuracy for small amounts of location error and high overlap ratios. On the other hand, the discriminatory power of the estimated distributions of the learnt features have been observed to be more effective in learning the appearance variations of a target and hence, the presently described tracker shows good performance in occlusions (OCC) and deformation (DEF) attributes as shown in FIG. 7.

The effectiveness of the learnt strong appearance feature can be justified by the results on the sequences with appearance changes, e.g. the deformation attribute. The second reason is that the way that the proposed algorithm updates the model to make it more robust to appearance changes and occlusions. The Gaussian update strategy allows the model to have memory for previous tracking results, while obviating the need for two-stream approaches for storing previous features. The effectiveness of the updating strategy can be seen from the results on the sequences with out of view and occlusion. Overall, stronger appearance features learnt for each target combined with an update strategy makes the proposed tracker capable of accurately tracking and localizing the target.

Accordingly, the above provides a tracking algorithm wherein a CNN for tracking is trained in a simple but effective way, and the CNN provides good features for object tracking.

The experimental results demonstrate that the presently described deep, appearance model learning tracker produces results comparable to state-of-the-art approaches and can generate accurate tracking results.

In order to observe the effectiveness of each weight-tuning step in the presently described algorithm, multiple experiments were conducted with three pairs of baselines. The first pair of baselines, referred to as the "pre-trained", is to take the pretrained model [25] as the feature extractor (without finetuning for objectness and target appearance) and use the present tracker to track every target in each sequence. By "no bp" it is meant that during tracking process only Gaussian parameters are updated and CNNs are not finetuned. The second pair of baselines, referred to the "obj-general", is to take the CNN model we trained for objectness as the feature extractor. To show the importance of fine-tuning for objectness, a third pair of baselines is added, which is referred to as the "no obj-general". For this baseline, the objectness step is removed, and CNNs are fine-tuned directly from the pre-trained model. Comparisons with the baselines are illustrated in FIG. 10.

Figure 10A:
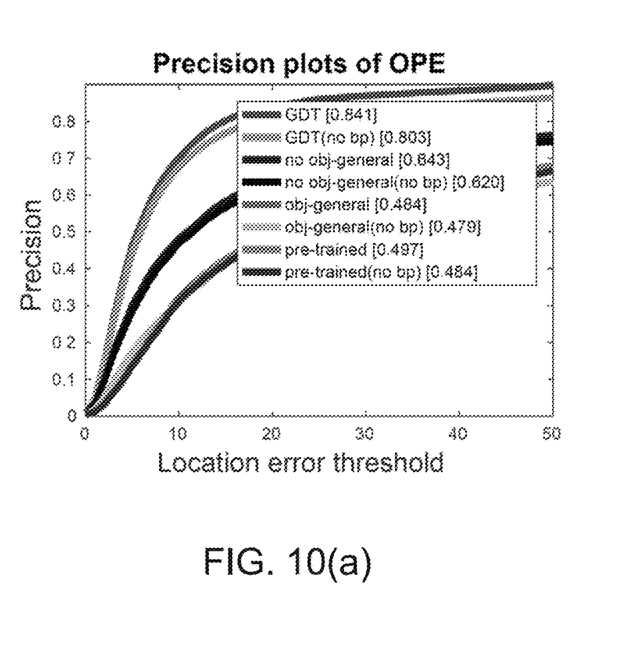
FIGS. 10(a) and 10(b) demonstrate precision and success plots for an ablation study.
Figure 10B:
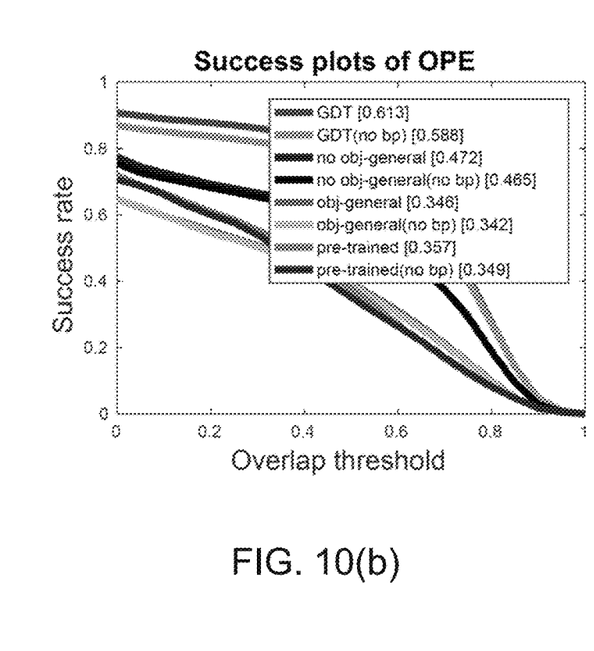

From FIG. 10, it can be observed that each step of the algorithm boosts the tracking results. Firstly, as can be seen from the ablation studies, removing fine-tuning for objectness results in a large drop of tracking results. Since for the tracking problem the amount of available training data is typically very limited (one training example from the first frame in each sequence), fine-tuning with auxiliary data can be very important. However, the CNN trained for objectness itself does not appear to bring any improvement on tracking since both obj-general and pre-trained models do not contain any feature learning for certain tracking targets. In other words, objectness can greatly contribute to the later fine-tuning steps. Secondly, obj-specific fine-tuning largely boost the tracking results. The benefit of this step can be observed, since the CNN is trained for a certain tracking target and the learnt features are more discriminative. The ablation study also suggest that online fine-tuning does have a positive impact on tracking results which means learning object features adaptively during tracking is an important step in the deep learning tracking system described herein.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the system 10, 30, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are just for example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as outlined in the appended claims.

REFERENCES

[1] Amit Adam, Ehud Rivlin, Ilan Shimshoni, "Robust fragments-based tracking using the integral histogram". 2006.
[2] Alex Krizhevsky, Ilya Sutskever, Geoffrey E. Hinton, "ImageNet Classification with Deep Convolutional Neural Networks". 2012. URL http://papers.nips.cc/paper/4824-imagenet-classification-with-deep-convolutional-neural-networks.pdf.
[3] Shai Avidan, "Ensemble tracking", *Pattern Analysis and Machine Intelligence, IEEE Transactions on*, vol. 29, no. 2, pp. 261-271, 2007.
[4] Shai Avidan, "Support vector tracking", *Pattern Analysis and Machine Intelligence, IEEE Transactions on*, vol. 26, no. 8, pp. 1064-1072, 2004.
[5] B. Babenko, Ming-Hsuan Yang, S. Belongie, "Robust Object Tracking with Online Multiple Instance Learning", *Pattern Analysis and Machine Intelligence, IEEE Transactions on*, vol. 33, no. 8, pp. 1619-1632, 2011.
[6] Robert T Collins, Yanxi Liu, Marius Leordeanu, "Online selection of discriminative tracking features", *Pattern Analysis and Machine Intelligence, IEEE Transactions on*, vol. 27, no. 10, pp. 1631-1643, 2005.
[7] Martin Danelljan, Fahad Shahbaz Khan, Michael Felsberg, Joost van de Weijer, "Adaptive color attributes for real-time visual tracking". 2014.
[8] Thang Ba Dinh, Nam Vo, Gérard Medioni, "Context tracker: Exploring supporters and distracters in unconstrained environments". 2011.
[9] Helmut Grabner, Christian Leistner, Horst Bischof, "Semi-supervised on-line boosting for robust tracking". 2008.
[10] S. Hare, A. Saffari, P. H. S. Torr, "Struck: Structured output tracking with kernels". 2011.
[11] Allan D Jepson, David J Fleet, Thomas F El-Maraghi, "Robust online appearance models for visual tracking", *Pattern Analysis and Machine Intelligence, IEEE Transactions on*, vol. 25, no. 10, pp. 1296-1311, 2003.
[12] Kaihua Zhang, Lei Zhang, Ming-Hsuan Yang, "Real-Time Object Tracking Via Online Discriminative Feature Selection", *Image Processing, IEEE Transactions on*, vol. 22, no. 12, pp. 4664-4677, 2013.
[13] Zdenek Kalal, Jiri Matas, Krystian Mikolajczyk, "Pn learning: Bootstrapping binary classifiers by structural constraints". 2010.
[14] Junseok Kwon, Kyoung Mu Lee, "Visual tracking decomposition". 2010.
[15] Katja Nummiaro, Esther Koller-Meier, Luc Van Gool, "An adaptive color-based particle filter", *Image and vision computing*, vol. 21, no. 1, pp. 99-110, 2003.
[16] Shaul Oron, Aharon Bar-Hillel, Dan Levi, Shai Avidan, "Locally orderless tracking". 2012.
[17] Horst Possegger, Thomas Mauthner, Horst Bischof, "In Defense of Color-based Model-free Tracking". 2015.
[18] David A Ross, Jongwoo Lim, Ruei-Sung Lin, Ming-Hsuan Yang, "Incremental learning for robust visual tracking", *International Journal of Computer Vision*, vol. 77, no. 1-3, pp. 125-141, 2008.
[19] Tianzhu Zhang, Si Liu, Changsheng Xu, Shuicheng Yan, B. Ghanem, N. Ahuja, Ming-Hsuan Yang, "Structural Sparse Tracking". 2015.
[20] Hanxuan Yang, Ling Shao, Feng Zheng, Liang Wang, Zhan Song, "Recent advances and trends in visual tracking: A review", *Neurocomputing*, vol. 74, no. 18, pp. 3823-3831, 2011.
[21] Yi Wu, Jongwoo Lim, Ming-Hsuan Yang, "Online Object Tracking: A Benchmark". 2013.
[22] Kaihua Zhang, Lei Zhang, Ming-Hsuan Yang, "Real-time compressive tracking". 2012.
[23] J. F. Henriques, R. Caseiro, P. Martins, and J. Batista, "High-speed tracking with kernelized correlation filters," Pattern Analysis and Machine Intelligence, IEEE Transactions on, vol. 37, no. 3, pp. 583-596, 2015.
[24] N. Wang, S. Li, A. Gupta, and D.-Y. Yeung, "Transferring rich feature hierarchies for robust visual tracking," arXiv preprint arXiv:1501.04587, 2015.
[25] C. Ma, J.-B. Huang, X. Yang, and M.-H. Yang, "Hierarchical convolutional features for visual tracking," in Proceedings of the IEEE International Conference on Computer Vision, 2015, pp. 3074-3082.
[26] Y. Qi, S. Zhang, L. Qin, H. Yao, Q. Huang, J. Lim, and M.-H. Yang, "Hedged deep tracking," 2016.
[27] L. Wang, W. Ouyang, X. Wang, and H. Lu, "Visual tracking with fully convolutional networks," in Proceedings of the IEEE International Conference on Computer Vision, 2015, pp. 3119-3127.

The invention claimed is:
1. A method for object tracking in a sequence of images of a scene acquired by an imaging device, the method comprising:
generating a representation of an object and its surroundings;
generating a tracking score based on the representation of the object and its surroundings, and a classification scheme;

detecting a peak in the tracking score corresponding to a location of the object in the image;

adjusting the representation of the object and its surroundings and the classification scheme according to one or more new appearances of the object; and performing an iterative adaptive adjustment to update image representations and classifiers.

2. The method according to claim 1 further comprising performing a multiple resolution and multiple scale procedure to encompass changes of the object size and scale in a consecutive frame.

3. The method according to claim 1 further comprising using a high dimensional representation of the object and its surroundings, wherein the high dimensional representation is a numeric representation of image data for the image.

4. The method according to claim 3 further comprising using an automatically learned image representation.

5. The method according to claim 1 further comprising using a set of weak classifiers to generate the tracking score for a new observation.

6. The method according to claim 1 further comprising performing an optimization procedure to maximize the tracking score for the object of interest.

7. The method according to claim 1 further comprising performing an iterative adjustment based on strong observations by rejection of the outliers.

8. The method according to claim 1 further comprising generating a strong classifier by combining weak classifiers.

9. A non-transitory computer readable medium comprising computer executable instructions for object tracking in a sequence of images of a scene acquired by an imaging device, comprising instructions for:

generating a representation of an object and its surroundings;

generating a tracking score based on the representation of the object and its surroundings, and a classification scheme;

detecting a peak in the tracking score corresponding to a location of the object in the image;

adjusting the representation of the object and its surroundings and the classification scheme according to one or more new appearances of the object; and performing an iterative adaptive adjustment to update image representations and classifiers.

10. The non-transitory computer readable medium according to claim 9 further comprising performing a multiple resolution and multiple scale procedure to encompass changes of the object size and scale in a consecutive frame.

11. The non-transitory computer readable medium according to claim 9 further comprising using a high dimensional representation of the object and its surroundings, wherein the high dimensional representation is a numeric representation of image data for the image.

12. The non-transitory computer readable medium according to claim 11 further comprising using an automatically learned image representation.

13. The non-transitory computer readable medium according to claim 9 further comprising using a set of weak classifiers to generate the tracking score for a new observation.

14. The non-transitory computer readable medium according to claim 9 further comprising performing an optimization procedure to maximize the tracking score for the object of interest.

15. The non-transitory computer readable medium according to claim 9 further comprising performing an iterative adjustment based on strong observations by rejection of the outliers.

16. The non-transitory computer readable medium according to claim 9 further comprising generating a strong classifier by combining weak classifiers.

17. A system comprising a processor and memory, the memory comprising computer executable instructions for object tracking in a sequence of images of a scene acquired by an imaging device, comprising instructions for:

generating a representation of an object and its surroundings;

generating a tracking score based on the representation of the object and its surroundings, and a classification scheme;

detecting a peak in the tracking score corresponding to a location of the object in the image;

adjusting the representation of the object and its surroundings and the classification scheme according to one or more new appearances of the object; and performing an iterative adaptive adjustment to update image representations and classifiers.

18. A method for object tracking in a sequence of images of a scene acquired by an imaging device, the method comprising:

generating a high dimensional representation of an object and its surroundings, wherein the high dimensional representation is a numeric representation of image data for the image;

generating a tracking score based on the representation of the object and its surroundings, and a classification scheme;

detecting a peak in the tracking score corresponding to a location of the object in the image; and adjusting the representation of the object and its surroundings and the classification scheme according to one or more new appearances of the object.

19. The method according to claim 18 further comprising performing a multiple resolution and multiple scale procedure to encompass changes of the object size and scale in a consecutive frame.

20. The method according to claim 18 further comprising using a set of weak classifiers to generate the tracking score for a new observation.

21. The method according to claim 18 further comprising using an automatically learned image representation.

22. The method according to claim 18 further comprising performing an adaptive adjustment in the learned representative representation of the image in the following image frames.

23. The method according to claim 18 further comprising performing an adaptive adjustment in the set of classifiers in order to compute the tracking score.

24. The method according to claim 18 further comprising performing an iterative adaptive adjustment to simultaneously update image representations and classifiers.

25. The method according to claim 24 further comprising performing an optimization procedure to maximize the tracking score for the object of interest.

26. The method according to claim 24 further comprising performing an iterative adjustment based on strong observations by rejection of the outliers.

27. The method according to claim 18 further comprising generating a strong classifier by combining weak classifiers.

28. A non-transitory computer readable medium comprising computer executable instructions for object tracking in a sequence of images of a scene acquired by an imaging device, comprising instructions for:
- generating a high dimensional representation of an object and its surroundings, wherein the high dimensional representation is a numeric representation of image data for the image;
- generating a tracking score based on the representation of the object and its surroundings, and a classification scheme;
- detecting a peak in the tracking score corresponding to a location of the object in the image; and
- adjusting the representation of the object and its surroundings and the classification scheme according to one or more new appearances of the object.

29. The non-transitory computer readable medium according to claim 28 further comprising performing a multiple resolution and multiple scale procedure to encompass changes of the object size and scale in a consecutive frame.

30. The non-transitory computer readable medium according to claim 28 further comprising using a set of weak classifiers to generate the tracking score for a new observation.

31. The non-transitory computer readable medium according to claim 28 further comprising using an automatically learned image representation.

32. The non-transitory computer readable medium according to claim 28 further comprising performing an adaptive adjustment in the learned representative representation of the image in the following image frames.

33. The non-transitory computer readable medium according to claim 28 further comprising performing an adaptive adjustment in the set of classifiers in order to compute the tracking score.

34. The non-transitory computer readable medium according to claim 28 further comprising performing an iterative adaptive adjustment to simultaneously update image representations and classifiers.

35. The non-transitory computer readable medium according to claim 34 further comprising performing an optimization procedure to maximize the tracking score for the object of interest.

36. The non-transitory computer readable medium according to claim 34 further comprising performing an iterative adjustment based on strong observations by rejection of the outliers.

37. The non-transitory computer readable medium according to claim 28 further comprising generating a strong classifier by combining weak classifiers.

38. A system comprising a processor and memory, the memory comprising computer executable instructions for object tracking in a sequence of images of a scene acquired by an imaging device, comprising instructions for:
- generating a high dimensional representation of an object and its surroundings, wherein the high dimensional representation is a numeric representation of image data for the image;
- generating a tracking score based on the representation of the object and its surroundings, and a classification scheme;
- detecting a peak in the tracking score corresponding to a location of the object in the image; and
- adjusting the representation of the object and its surroundings and the classification scheme according to one or more new appearances of the object.

* * * * *

UNITED STATES PATENT AND TRADEMARK OFFICE
CERTIFICATE OF CORRECTION

PATENT NO. : 10,430,953 B2
APPLICATION NO. : 15/926721
DATED : October 1, 2019
INVENTOR(S) : Mehrsan Roshtkhari Javan, Mengyao Zhai and Gregory Peter Mori It is certified that error appears in the above-identified patent and that said Letters Patent is hereby corrected as shown below:

On the Title Page

Item (72) after "Inventors:", delete "Roshtkhari Javan" in the first inventor's name and substitute therefor --- Javan Roshtkhari ---

Signed and Sealed this
Fifteenth Day of June, 2021

Drew Hirshfeld
*Performing the Functions and Duties of the*
*Under Secretary of Commerce for Intellectual Property and*
*Director of the United States Patent and Trademark Office*